(12) United States Patent
Booth (10) Patent No.: US 11,188,358 B2
(45) Date of Patent: Nov. 30, 2021

(54) INTERACTION APPARATUS AND METHOD (71) Applicant: Sony Interactive Entertainment Inc., Tokyo (JP)

(72) Inventor: John Booth, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/479,699

(22) PCT Filed: Jan. 11, 2018

(86) PCT No.: PCT/GB2018/050069
§ 371 (c)(1),
(2) Date: Jul. 22, 2019

(87) PCT Pub. No.: WO2018/138476
PCT Pub. Date: Aug. 2, 2018

(65) Prior Publication Data
US 2020/0159551 A1    May 21, 2020

(30) Foreign Application Priority Data

Jan. 24, 2017 (GB) .................................... 1701168

(51) Int. Cl.
*G06F 9/44* (2018.01)
*G06F 9/445* (2018.01)
(Continued)

(52) U.S. Cl.
CPC ............... *G06F 9/453* (2018.02); *G06F 8/61* (2013.01); *G06F 8/65* (2013.01)

(58) Field of Classification Search
CPC ............... G06F 9/453; G06F 8/61; G06F 8/65
See application file for complete search history.

(56) References Cited

U.S. PATENT DOCUMENTS

| 6,466,897 B1 | 10/2002 | Yoshida |
| 2005/0091269 A1* | 4/2005 | Gerber ................ G06F 9/44505 |

(Continued)

FOREIGN PATENT DOCUMENTS

GB    2517792 A    3/2015

OTHER PUBLICATIONS

Gerard Bosch i Creus, Feature Interaction Control on Smartphones, 2007, pp. 302-309. https://ieeexplore.IEEE.org/stamp/stamp.jsp?tp=&arnumber=4297349&isnumber=4297297 (Year: 2007).*

(Continued)

*Primary Examiner* — Mongbao Nguyen
(74) *Attorney, Agent, or Firm* — Matthew B. Dernier, Esq.

(57) ABSTRACT

An interaction method for notifying a first user of one or more software features available on a device of the first user includes, for respective ones of a plurality of software features, recording interactions with the software feature by the first user; and calculating a level of interaction with the software feature, and then selecting for notification one or more of the plurality of software features, responsive to selection criteria comprising the respective level of interaction with each software feature, and generating for display to the first user a notification of the selected one or more of the plurality of software features.

12 Claims, 4 Drawing Sheets

(51) Int. Cl.
  *G06F 9/455*    (2018.01)
  *G06F 9/451*    (2018.01)
  *G06F 8/61*     (2018.01)
  *G06F 8/65*     (2018.01)

(56) References Cited

U.S. PATENT DOCUMENTS

| | | | |
|---|---|---|---|
| 2007/0277104 A1* | 11/2007 | Hennum | G06F 9/453 |
| | | | 715/705 |
| 2008/0250323 A1* | 10/2008 | Huff | G06F 9/453 |
| | | | 715/733 |
| 2010/0031282 A1* | 2/2010 | Torimaru | H04N 21/47 |
| | | | 725/9 |
| 2010/0205530 A1* | 8/2010 | Butin | G06F 9/453 |
| | | | 715/715 |
| 2010/0229120 A1 | 9/2010 | Inoue | |
| 2011/0276568 A1* | 11/2011 | Fotev | G06F 16/951 |
| | | | 707/728 |
| 2011/0279359 A1* | 11/2011 | McCarty | H04N 5/44543 |
| | | | 345/156 |
| 2012/0166946 A1 | 6/2012 | Bombolowsky | |
| 2012/0179964 A1 | 7/2012 | Yun | |
| 2012/0309511 A1* | 12/2012 | Chung | H04N 21/4781 |
| | | | 463/30 |
| 2014/0325398 A1* | 10/2014 | van de Bruggen | G06F 9/453 |
| | | | 715/760 |
| 2015/0242510 A1* | 8/2015 | Shapira | G06F 8/61 |
| | | | 707/706 |
| 2016/0006730 A1* | 1/2016 | Chari | H04L 63/0861 |
| | | | 726/7 |
| 2016/0048479 A1* | 2/2016 | Koga | G06F 40/106 |
| | | | 715/243 |
| 2016/0092085 A1* | 3/2016 | Kitner | G06F 3/017 |
| | | | 715/738 |
| 2016/0179877 A1* | 6/2016 | Koerner | G06F 16/243 |
| | | | 707/721 |
| 2016/0217198 A1* | 7/2016 | Lee | G06K 9/4628 |
| 2016/0308733 A1* | 10/2016 | Chauhan | G06F 8/61 |
| 2017/0017381 A1* | 1/2017 | Wei | G06F 9/452 |
| 2017/0108995 A1* | 4/2017 | Ali | G06F 40/237 |
| 2017/0193059 A1* | 7/2017 | Glover | G06F 8/61 |
| 2017/0255455 A1* | 9/2017 | Collier | G06F 11/3438 |
| 2018/0060093 A1* | 3/2018 | Irvine | G09B 19/00 |
| 2018/0067734 A1* | 3/2018 | Prasad | G06F 11/302 |
| 2018/0232213 A1* | 8/2018 | Greene | G06Q 40/02 |
| 2019/0079787 A1* | 3/2019 | Toksoz | G06F 9/452 |
| 2020/0226839 A1* | 7/2020 | Daniels | G06F 3/04842 |

OTHER PUBLICATIONS

Examination report or corresponding GB Application No. 1701168.5, 5 pages, dated Jan. 31, 2020.
International Search Report and Written Opinion for corresponding PCT Application No. PCT/GB2018/050069, 15 pages, dated Mar. 28, 2018.
Combined Search and Examination report or corresponding GB Application No. 1701168.5, 4 pages, dated Jul. 7, 2017.
Communication pursuant to Article 94(3) corresponding to EP Application No. 18700811.5, 4 pages, dated Feb. 22, 2021.

* cited by examiner

INTERACTION APPARATUS AND METHOD

BACKGROUND

The present invention relates to an interaction apparatus and method.

Modern software can be very complex and feature rich. Consequently, when first installing or using such software, it is commonplace to provide a 'getting started' or 'what's new' quick-start guide for users, for example during the installation process or upon first use of the software. Subsequently, the user can seek in-depth and detailed guidance on particular features of the software by searching for these within a help system provided by the software. However, there is scope to improve upon this set of offerings.

SUMMARY OF THE INVENTION

Respective aspects and features of the invention are disclosed herein and defined in the appended claims.

BRIEF DESCRIPTION OF THE DRAWING

Embodiments of the present invention will now be described by way of example with reference to the accompanying drawings, in which.

DETAILED DESCRIPTION OF THE INVENTION

An interaction apparatus and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

An example of a computer system on which software may be found (e.g. an operating system, default or bundled apps, and purchased apps such as games) is the Sony® PlayStation 4® entertainment device or console.

Figure 1:
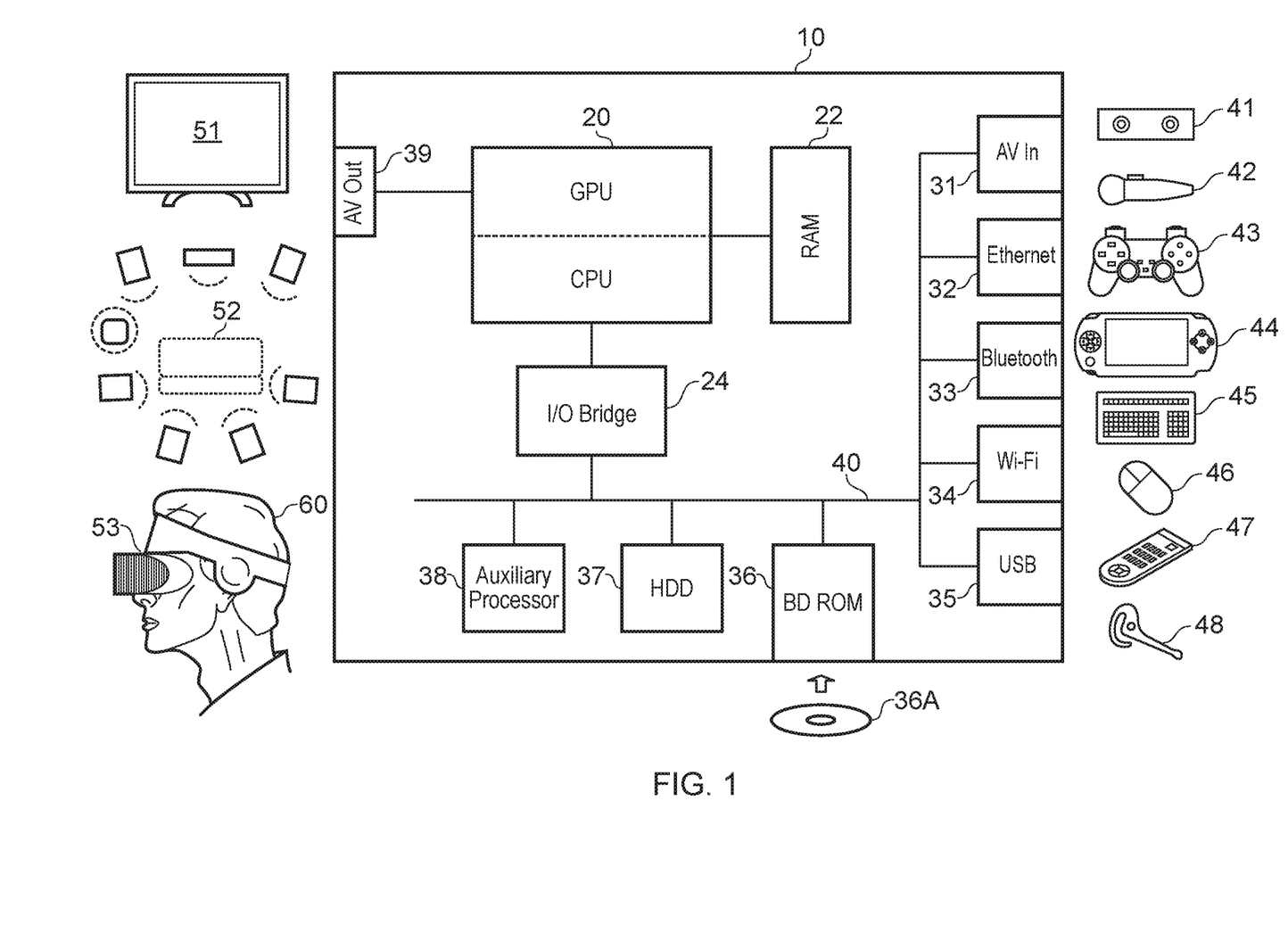
FIG. 1 is a schematic diagram of an apparatus in accordance with embodiments of the present invention.

FIG. 1 schematically illustrates the overall system architecture of a Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the Dual Shock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

Figure 2:
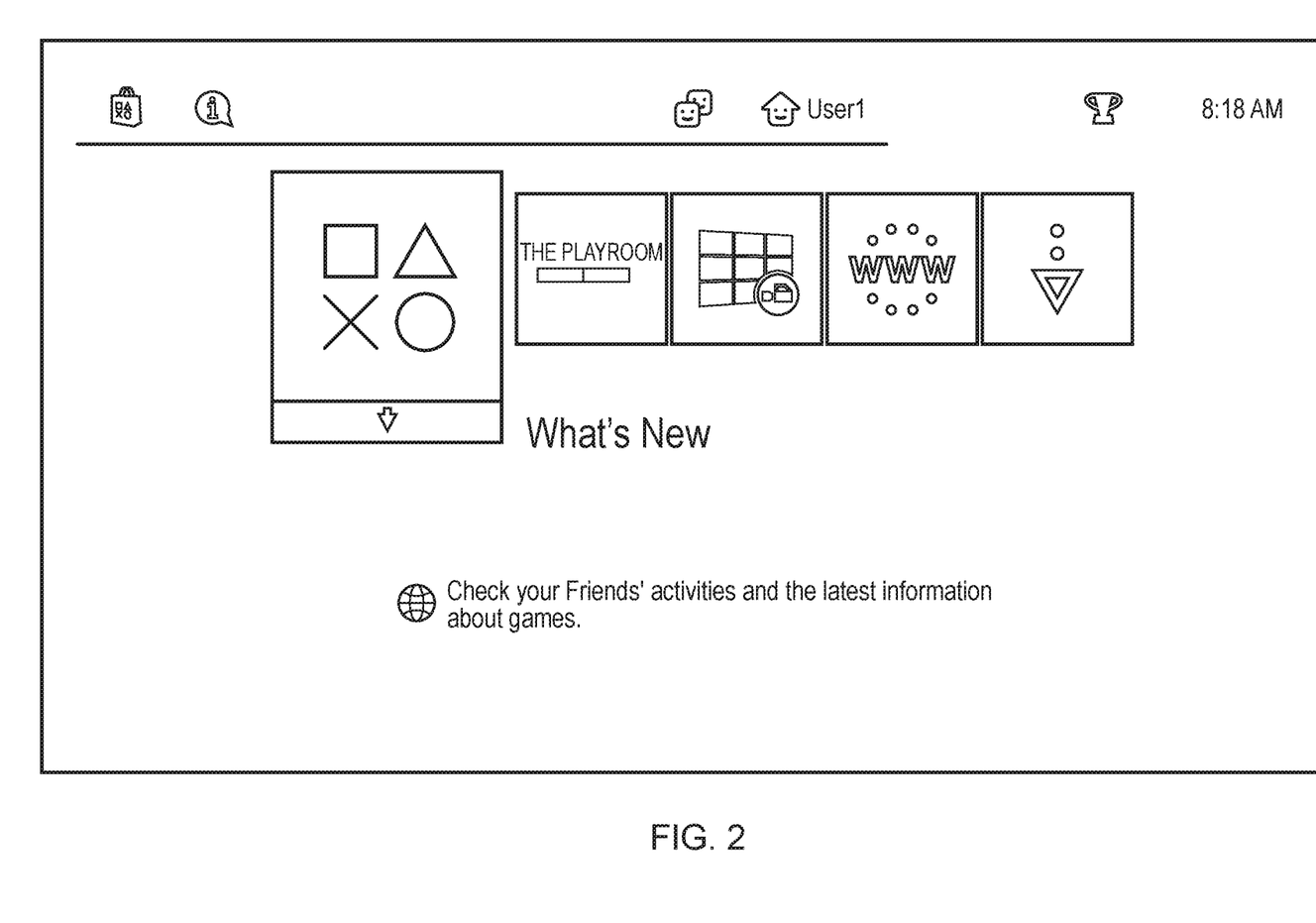
FIG. 2 is an exemplary diagram of a user interface.

FIG. 2 provides an example of this menu. The number of features are displayed at a high level within a hierarchy of options, one of which is a 'What's New' option. This option can provide an aggregate of different data feeds, including news about friends' activities within the PlayStation network, news about new releases or trailers, and also new or upgraded software that has been downloaded to the system.

Figure 3:
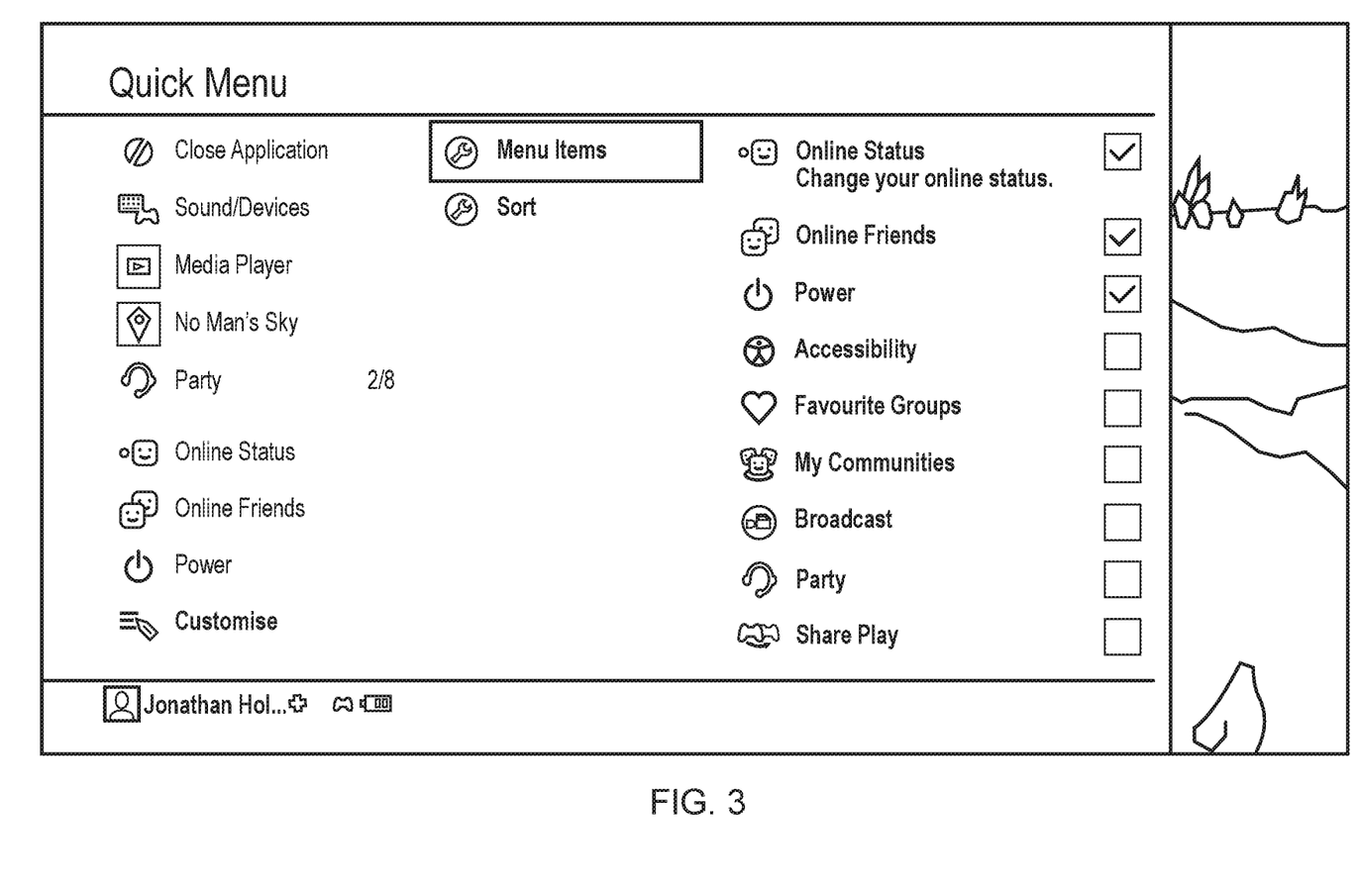
FIG. 3 is an exemplar diagram of a user interface.

However, the information included in this option is therefore dependent upon external events rather than the user's needs Referring now also to FIG. 3, a quick menu is also provided that includes commonly used functions relating to the current game, on-line activity and some system functions. This quick menu can also be customised by the user to include features they wish to commonly access.

Hence similarly this menu comprises a set of default options, except where the user knows of a particular function they wish to access frequently.

Meanwhile, a full blown help system provides all available information, accessible either via a hierarchical tree or a search, but this requires knowing what you're looking for.

The present inventors have appreciated that by contrast, there is no provision to tell users about useful features of a system that are being underutilised or overlooked. These features may have been included in a quickstart guide, and are likely to be discussed in a help file, but the user is unaware or has forgotten about them.

Figure 4:
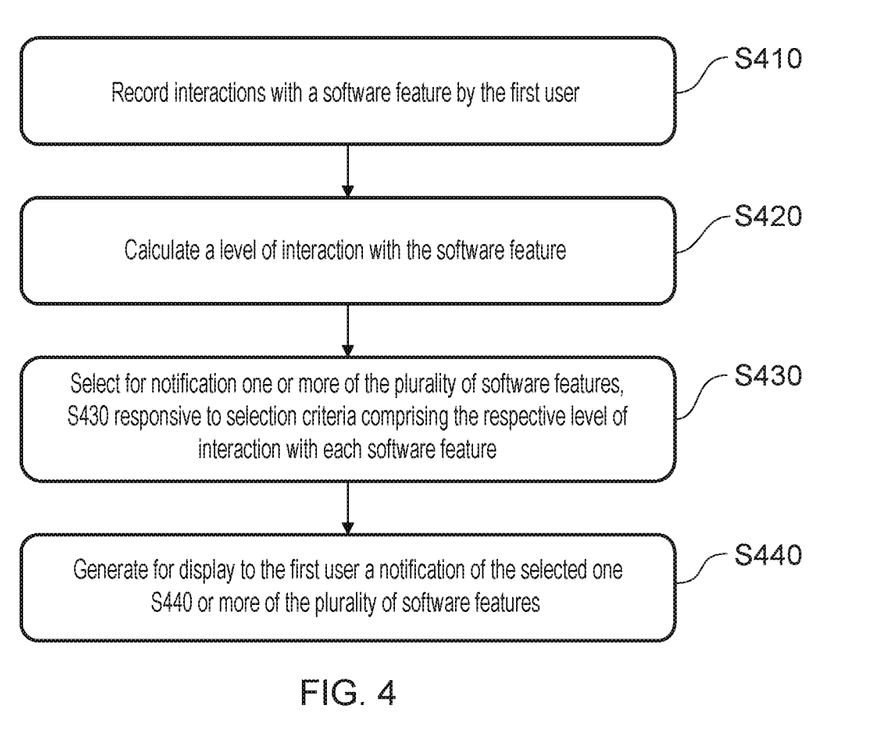
FIG. 4 is a flow diagram of an interaction method in accordance with embodiments of the present invention.

Accordingly, referring now to FIG. 4, in an embodiment of the present invention an interaction method is provided for notifying a first user of one or more software features available on a device of the first user. As noted previously, the software features for example can be those of an operating system, application or downloadable content either as initially installed or subsequently updated.

The method comprises, for respective ones of a plurality of software features;

in a first step s410, recording interactions with a software feature by the first user; and in a second step S420, calculating a level of interaction with the software feature;

then, the method comprises in a third step s430, selecting for notification one or more of the plurality of software features, responsive to selection criteria comprising the respective level of interaction with each software feature; and in a fourth step s440, generating for display to the first user a notification of the selected one or more of the plurality of software features.

Interactions may be recorded for example using a database, associative table or histogram with entries for the respective software features.

In an embodiment of the present invention, the selecting step comprises the step of detecting whether the respective level of interaction is below a predetermined threshold. In other words, subject to consideration of any other aspects of the criteria (see later herein), a software feature may be selected for notification if the recorded level of interaction is below the predetermined threshold.

The predetermined threshold, meanwhile, may be a predetermined threshold value for a respective software feature, for example as set by the software developers. These thresholds can be provided as part of the installation, or may be downloaded and/or periodically updated via the Internet.

Instead of relating to a single software feature, such a predetermined threshold may instead relate to a respective class of software features, being features of a similar type; for example an art package, a photo retouching package and a desktop publishing package might be considered similar, or within a single art application, a redeye removal tool, a scratch removal tool and a noise reduction tool might be considered similar, either due to similar functionality or because for example they might all be accessible by the same menu.

Alternatively or in addition to developer, devices hosting operating systems or apps implement in embodiments of the present invention may transmit usage interaction level information to one or more servers that can collate levels of interaction with software features among a broader user population. Consequently a threshold level may be set responsive to usage levels within the broader population so that the threshold can reflect overall popularity in the software feature, and/or respond to trends in usage. Hence for example the threshold may be set at an interaction level equal to half the average interaction level among that proportion of the population that have had any interaction with the software feature, or the threshold may be set for example at half or one standard deviation from the average interaction level among that proportion of the population that have had any interaction with the software feature. The sample population could be global, national, or regional, and/or filtered according to the user's age, gender, preferred language or other demographic features. Similarly for example the population may be limited to a single corporation or office, optionally with filters according to job role or other demographics.

Again, this principle can be extended from a single software feature to a respective class of software features in a similar manner to that described previously in relation to predetermined threshold levels.

From the above discussion it will also be clear that the present invention can be applied at the operating system level both for hosted applications and features within hosted applications, and/or the present invention can be applied at the individual app level for features within the app.

In an embodiment of the present invention, the method further comprises the step of storing respective priority values for at least some of the plurality of software features, and the selection criteria further comprises the priority value for the respective software feature.

Consequently, the step of selecting a software feature notification may comprise for example weighting the threshold according to the priority value, or dividing the recorded level of interaction by the priority value so that all else being equal, higher priority software features generate an overall lower resultant value.

The generated resultant value may then be evaluated against an appropriate threshold, and/or the results may be ranked (see later herein).

The priority value itself for a respective software feature may be a default priority value provided by developers.

Alternatively or in addition, or the priority value may be responsive to the level of user interaction with another respective software feature in the same class of software features; continuing the examples above, if a user has made use of an art package, then the priority of a complementary package such as a photo retouching program may be increased. Similarly if a user has selected a red-eye reduction tool, then the priority of a scratch removal tool may be increased.

Alternatively or in addition, or the priority value may be responsive to the use of the respective software feature above a predetermined threshold level of interaction by a second user of the device of the first user. In other words, where the device (such as a Sony PlayStation 4 or PC) can host different user accounts, the use of a software feature by one user may influence the priority of that software feature for other users. This can help spread awareness, co-operation, and/or best practice between users.

Alternatively or in addition, the priority value may be responsive to the presence on the device of content usable by the respective software feature. For example if the user happens to download a music file onto their device, the priority of a playback application may be increased.

Similarly where such content changes (for example where more music is downloaded, or different music formats are downloaded), the priority of software features relevant to the playback of the content can be increased.

Optionally, a software feature may be represented by a token or stub record where the software feature itself has been deleted but may subsequently be desired or of help to the user; for example, where a user deletes a videogame to save space, but elects to keep some or all of their game saves, this behaviour may be indicative of an eventual desire to revisit the game. In this case the game saves represent content usable by the respective videogame, and so the videogame may still be noted as a (potentially) available software feature that the user may usefully be notified about. Hence more generally, software features that get deleted over time may optionally still be evaluated according to the techniques disclosed herein.

Alternatively or in addition, the priority value may be responsive to how long the software feature has been installed on the device. Timing may also be considered separately (see later herein), but could be used to influence priority in potentially different ways. For example, priority may be set high immediately after installation so that the notification system provides some "what new" notifications as an emergent property. The priority can then drop with time, and optionally adopt a so-called 'Mexican Hat' shape, where after a predetermined period of time the priority rises again to encourage awareness of an unused software feature, but subsequently drops again after a period of time as it becomes clear that this is a feature that the user is just not interested in.

Independently of whether or not the priority value is used to determine whether a software features to be notified to a user, optionally the period of time for which a respective software feature is notified to the user may be responsive to the associated priority value. Hence for example a higher priority software feature may remain in the notification list for several weeks or for M views of the notification list by the user, whereas a lower priority software feature may remain in the notification list for only several days or for N views of the notification list by the user, where N<M.

In an embodiment of the present invention, the method comprises the step of storing respective time values for at least some of the plurality of software features, and the selection criteria further comprises the time value for the respective software feature. This feature may be used separately to any time-based modification of the priority value.

The stored time value for a respective software feature may be the time since installation of the software feature on the device, the time since an update of the software feature on the device, the time since an installation of consumable data suitable for use with the software feature on the device, and/or the time since the software feature was previously notified to the user.

This latter timing may provide hysteresis in the system, preventing a software feature from re-appearing on the notification list too frequently. In this regard, separately the selection criteria may include a notification count, with the selection of the software feature for notification being responsive adversely to the number of notifications. For example, the threshold may be weighted down as the number of notifications increases, or a ranking may be reduced as the number of notifications increases.

With regards to ranking, it will be appreciated that potentially a large number of software features may have interaction levels fall below their thresholds, particularly when the user first starts using the device, or when new software is installed.

If all these software features were notified to the user, it could be overwhelming and counter-productive.

Accordingly, in an embodiment of the present invention the method comprises the steps of ranking the software features responsive to the selection criteria, and generating for display the N highest-ranking software features, where N is a predetermined number.

Hence for a given software feature, the selection criteria may be any combination of the level of interaction together with optionally one or more of whether the level of interaction meets a threshold, and similarly optionally a priority value and/or a timing value, as derived according to any of the techniques described herein.

Any suitable summation and/or weighting of multiple criteria may be envisaged to arrive at the combination. Hence for example one might expect high priority and/or newly installed or updated software features to rank highly, and similarly one may expect features related to those already used by user, or features used by another user of the device, or features popular with a wider population to similarly rank highly. Meanwhile one might expect features without a high priority or features that have remained unchanged on the device for a long period of time to rank lower, and similarly software features that have been recently notified or repeatedly notified may be expected to rank lower.

Then, as noted above, a predetermined number of the highest-ranking software features may be generated for display to the user in a notification.

Referring back to FIG. 2, the notifications may be voluntarily accessed by the user, by clicking on a 'What's New', 'Quick Guide', 'Hints' or other such option within a user interface of the device.

Alternatively or in addition, the notifications may be automatically presented within the user interface, for example as part of a quick menu, or a newsfeed style ticker along the bottom of the screen. The specific implementation would be a design choice.

It will be appreciated that the predetermined number of high-ranking software features may be a larger number for presentation of notifications within a voluntarily accessed 'What's New' style page than the predetermined number of high-ranking software features selected for an automatic notification. In any event, optionally a user can control the number of high-ranking features that are notified to them, and/or turn automatic notifications off if desired.

The level of interaction itself may be recorded in any suitable manner. For example it may be a simple count of the total number of interactions by the user with the software feature. In this case optionally the count can be arranged to decrement over time for example decrementing by one per hour, day, week, month, or year as deemed appropriate for the software feature's use case.

Alternatively the level of interaction may be expressed as a frequency of interaction, for example by determining the number of interactions over a given time period. Again this may be a rolling estimate, for example measuring the number of interactions per hour, day, week, month, or year as deemed appropriate for the software feature's use case.

It will be appreciated that not all software features present in an application or on the device may be included within a scheme incorporating the above techniques. The software features that are included within a scheme may optionally be determined by a developer of the software and/or scheme policies. A scheme policy may for example exclude software features relating to specific software types such as .bat, .scr or .dll, or exclude software utilising particular features of the operating system (for example, video games or other applications that use a full-screen mode, and which may also be promoted through other means). The scheme may also exclude or include software features according to commands from a remote administrator, such as a server operating on a network with which the device is arranged to communicate for administrative purposes (for example in relation to other aspects of the user's account, or software maintenance etc.).

It will be appreciated that the above methods may be carried out on a conventional apparatus suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

As noted previously, an example of such an apparatus is the Sony® PlayStation 4® entertainment device or console.

Accordingly, in an embodiment of the present invention an apparatus (such as the entertainment device 10), hosting software comprising a plurality of software features, may comprise a selection processor (for example, CPU 20A running under suitable software instruction), arranged to record interactions with a software feature by a first user and calculate a level of interaction the software feature, for respective ones of a plurality of software features. This processor is then also arranged to select for notification one or more of the plurality of software features, responsive to selection criteria comprising the respective level of interaction with each software feature. The apparatus also comprises an image processor (for example GPU 20B, optionally in conjunction with CPU 20A) arranged to generate for display to the first user a notification of the selected one or more of the plurality of software features.

The apparatus may comprise storage (such as RAM 22 and/or a hard disk 37) adapted to store respective priority values for at least some of the plurality of software features, and the selection criteria may further comprise the priority value for the respective software feature.

Similarly the apparatus may comprise storage (such as RAM 22 and/or a hard disk 37) adapted to store respective time values for at least some of the plurality of software features, and the selection criteria may further comprise the time value for the respective software feature.

Again, the apparatus may comprise a ranking processor (for example, CPU 20A running under suitable software instruction) adapted to rank the software features responsive to the selection criteria; and the image processor is adapted to then generate for display the N highest-ranking software features, where N is a predetermined number.

It will be appreciated that the apparatus may similarly implement any of the other methods and techniques disclosed herein, under suitable software instruction.

The invention claimed is:

1. An interaction method for notifying a first user of one or more software features available on a device of the first user, comprising the steps of:
    for respective ones of a plurality of software features;
    recording interactions with a software feature by the first user; and
    calculating a level of interaction with the software feature, and
    storing respective priority values for at least some of the plurality of software features;
    selecting for notification one or more of the plurality of software features, responsive to selection criteria comprising a respective level of interaction with each software feature, where a period of time, for which a respective software feature is notified to the first user, is responsive to the associated respective priority value;
    generating for display to the first user a notification of the selected one or more of the plurality of software features; and in which
    the selection criteria further comprises the priority value for the respective software feature; and the stored priority value for the respective software feature is responsive to one or more selected from a list of:
    i. the level of user interaction with another respective software feature in the same class of software features;
    ii. the use of the respective software feature above a predetermined threshold level of interaction by a second user of the device of the first user;
    iii. the presence on the device of content usable by the respective software feature; and
    iv. a change of content usable by the respective software feature, and
    wherein the predetermined threshold is a threshold based upon levels of interaction for a respective class of software features by a population of users and the threshold is set at a interaction level at one standard deviation from the average interaction with the software feature,
    wherein the selection criteria includes a notification count, and the threshold is further weighted based on the number of the notification count to prevent the software feature from reappearing on a notification list frequently.

2. An interaction method according to claim 1, in which the selecting step comprises the step of: detecting whether the respective level of interaction is below the predetermined threshold.

3. An interaction method according to claim 2, in which the predetermined threshold is one of:
    i. a predetermined threshold value for the respective software feature;
    ii. a predetermined threshold value for a respective class of software features; and
    iii. a threshold based upon levels of interaction for the respective software feature by a population of users.

4. An interaction method according to claim 1, comprising the step of:
    storing respective time values for at least some of the plurality of software features; and
    in which the selection criteria further comprises a time value for the respective software feature.

5. An interaction method according to claim 4 in which the stored time value for the respective software feature is one or more of:
    i. a time since installation of the software feature on the device;
    ii. a time since an update of the software feature on the device;
    iii. a time since an installation of consumable data suitable for use with the software feature on the device; and
    iv. a time since the software feature was previously notified to the user.

6. An interaction method according to claim 1, comprising the steps of:
    ranking the software features responsive to the selection criteria; and
    generating for display the N highest-ranking software features, where N is a predetermined number.

7. An interaction method according to claim 1, in which the level of interaction is one or more of:
    i. a total number of interactions; and
    ii. a frequency of interactions.

8. A non-transitory, computer readable recording medium having computer executable instructions stored thereon, which when executed by a computer system, cause the computer system to carry out actions for notifying a first user of one or more software features available on a device of the first user, the actions comprising:

for respective ones of a plurality of software features;
recording interactions with a software feature by the first user; and
calculating a level of interaction with the software feature, and
storing respective priority values for at least some of the plurality of software features;
selecting for notification one or more of the plurality of software features, responsive to selection criteria comprising a respective level of interaction with each software feature, where a period of time, for which a respective software feature is notified to the first user is responsive to the associated respective priority value;
generating for display to the first user a notification of the selected one or more of the plurality of software features; and in which
the selection criteria further comprises the priority value for the respective software feature; and
the stored priority value for the respective software feature is responsive to one or more selected from a list of:
i. the level of user interaction with another respective software feature in the same class of software features;
ii. the use of the respective software feature above a predetermined threshold level of interaction by a second user of the device of the first user;
iii. the presence on the device of content usable by the respective software feature; and
iv. a change of content usable by the respective software feature, and
wherein the predetermined threshold is a threshold based upon levels of interaction for a respective class of software features by a population of users and the threshold is set at a interaction level at one standard deviation from the average interaction with the software feature,
wherein the selection criteria includes a notification count, and the threshold is further weighted based on the number of the notification count to prevent the software feature from reappearing on a notification list frequently.

9. An apparatus, hosting software comprising a plurality of software features, and the apparatus comprising:
a hardware processor, wherein the hardware processor configured to:
record interactions with a software feature by a first user; and
calculate a level of interaction the software feature, for respective ones of a plurality of software features;
store in a memory, respective priority values for at least some of the plurality of software features;
the hardware processor further configured to select for notification one or more of the plurality of software features, responsive to selection criteria comprising a respective level of interaction with each software feature, where a period of time for which a respective software feature is notified to the first user, is responsive to the associated respective priority value;
an image processor configured to generate for display to the first user a notification of the selected one or more of the plurality of software features; and in which
the selection criteria further comprises the priority value for the respective software feature; and
the stored priority value for the respective software feature is responsive to one or more selected from a list of:
i. the level of user interaction with another respective software feature in the same class of software features;
ii. the use of the respective software feature above a predetermined threshold level of interaction by a second user of the device of the first user;
iii. the presence on the device of content usable by the respective software feature; and
iv. a change of content usable by the respective software feature, and
wherein the predetermined threshold is a threshold based upon on levels of interaction for a respective class of software features by a population of users and the threshold is set at a interaction level at one standard deviation from the average interaction level among that proportion of the population of users that have had any interaction with the software feature,
wherein the selection criteria includes a notification count and the threshold is further weighted based on the number of the notification count to prevent the software feature from reappearing on a notification list frequently.

10. An apparatus according to claim 9, comprising:
store in the memory, respective priority values for at least some of the plurality of software features; and
in which the selection criteria further comprises the priority value for the respective software feature.

11. An apparatus according to claim 9, comprising:
store in the memory, respective time values for at least some of the plurality of software features; and in which
the selection criteria further comprises the time value for the respective software feature.

12. An apparatus according to claim 11, comprising:
the hardware processor configured to rank the software features responsive to the selection criteria; and
in which the image processor configured to generate for display the N highest-ranking software features, where N is a predetermined number.

* * * * *

UNITED STATES PATENT AND TRADEMARK OFFICE
CERTIFICATE OF CORRECTION

PATENT NO. : 11,188,358 B2  
APPLICATION NO. : 16/479699  
DATED : November 30, 2021  
INVENTOR(S) : John Booth Page 1 of 1

It is certified that error appears in the above-identified patent and that said Letters Patent is hereby corrected as shown below:

In the Claims

In Claim 1, Column 8, Line 16, change "interaction with" to --interaction level among that proportion of the population that have had interaction with--; and
In Claim 8, Column 9, Line 34, change "interaction with" to --interaction level among that proportion of the population that have had interaction with--.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*